Nov. 22, 1938.　　　　M. J. ULINE　　　　2,137,597

MACHINE FOR CUTTING ICE

Filed Feb. 5, 1936　　　9 Sheets-Sheet 1

Fig. 1.

Nov. 22, 1938.        M. J. ULINE        2,137,597
MACHINE FOR CUTTING ICE
Filed Feb. 5, 1936          9 Sheets-Sheet 5

Inventor
M. J. ULINE
By Pattison, Wright & Pattison
Attorneys

Patented Nov. 22, 1938

2,137,597

UNITED STATES PATENT OFFICE 2,137,597

MACHINE FOR CUTTING ICE

Migiel J. Uline, Washington, D. C.

Application February 5, 1936, Serial No. 62,531

10 Claims. (Cl. 143—38)

This invention relates to certain new and useful improvements in machines for cutting ice and more particularly to machines for cutting a block of ice into cubes and is an improvement on the construction of machine disclosed in my application, Serial No. 4,152, filed January 30, 1935, Patent No. 2,107,968, Feb. 8, 1938, the main object of my invention being to simplify the construction in order to allow the machine to be manufactured cheaply.

Another object of my invention is to provide a machine for cutting ice with a suspended ice carriage which is adapted to be reciprocated intermittently in order to bring the top of the ice into contact with the saws for forming the kerfs and the cut off saws.

Another object of my invention is to provide a machine for cutting ice having a reciprocating carriage which is intermittently reciprocated and in which is suspended the ice carriage whereby the block of ice will be moved intermittently at right angles in order to form parallel kerfs at right angles to one another in the upper end thereof.

Another object of my invention is to provide novel means for intermittently raising the cake of ice in the ice carriage in order to allow the kerfs to be formed and the cubes thus formed to be cut off.

A still further object of my invention is to provide elevating means for the ice within the ice carriage which is so constructed that it can be readily released after it has been elevated in order to allow it to return to its normal position, said means being so constructed that the elevating means can be operated manually to initially position the block of ice, thereby overcoming the difficulties existing with having to operate the machine to allow it to be automatically raised.

A still further object of the invention is to provide a machine which is very compact, the parts being arranged closely together so as to occupy a very small space.

Other and further objects and advantages of the invention will be hereinafter set forth and the novel features thereof defined by the appended claims.

Figures 5, 10, 13:
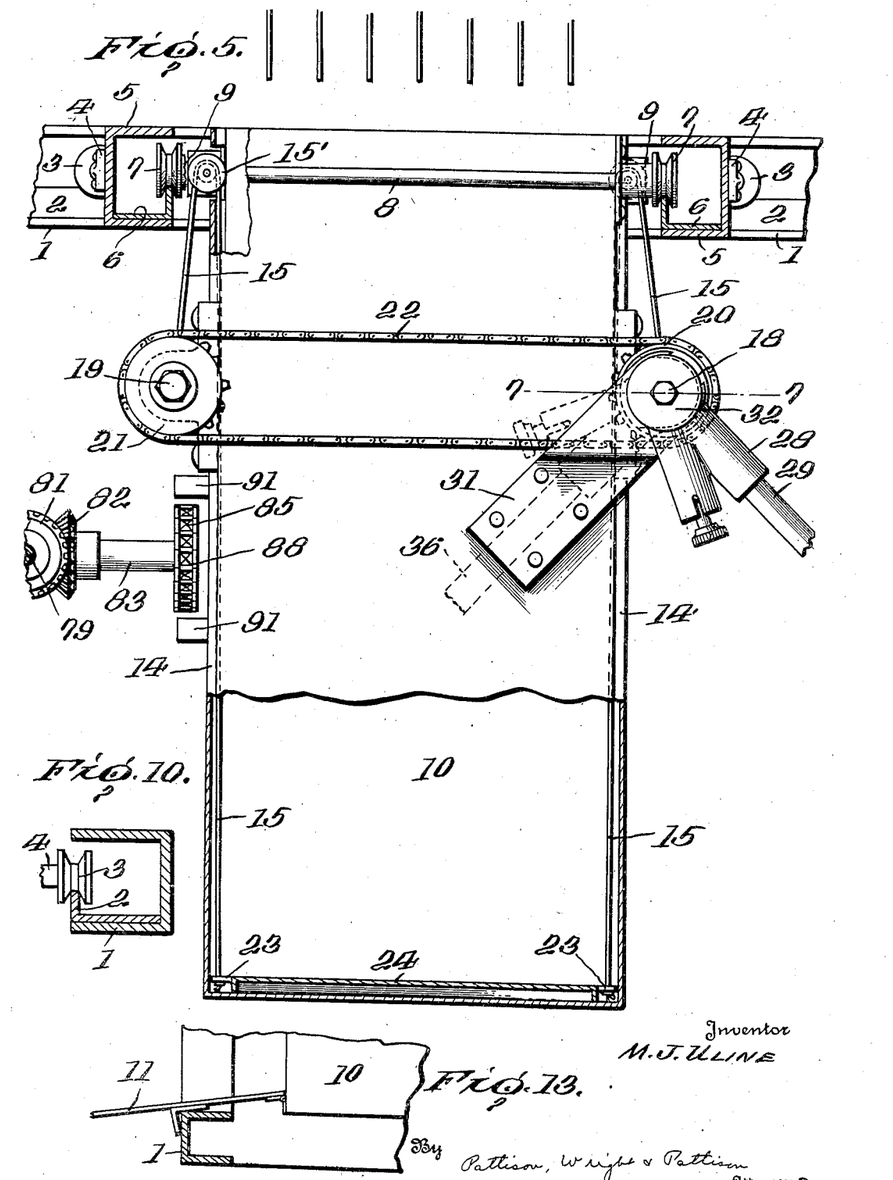
Figure 5 is a vertical section through the supporting frame of the ice carriage, the ice carriage being broken away to show the movable platform.
Figure 10 is a detail section through one of the channel bars constituting the upper members of the frame.
Figure 13 is a detail section, partly in elevation, showing the door dropped down to form a skid to hold the ice carriage in its proper position when a block of ice is being placed therein, the same being shown with a hook member which engages the door jamb and prevents the carriage from moving away as the block of ice is being pushed therein.
Figure 6:
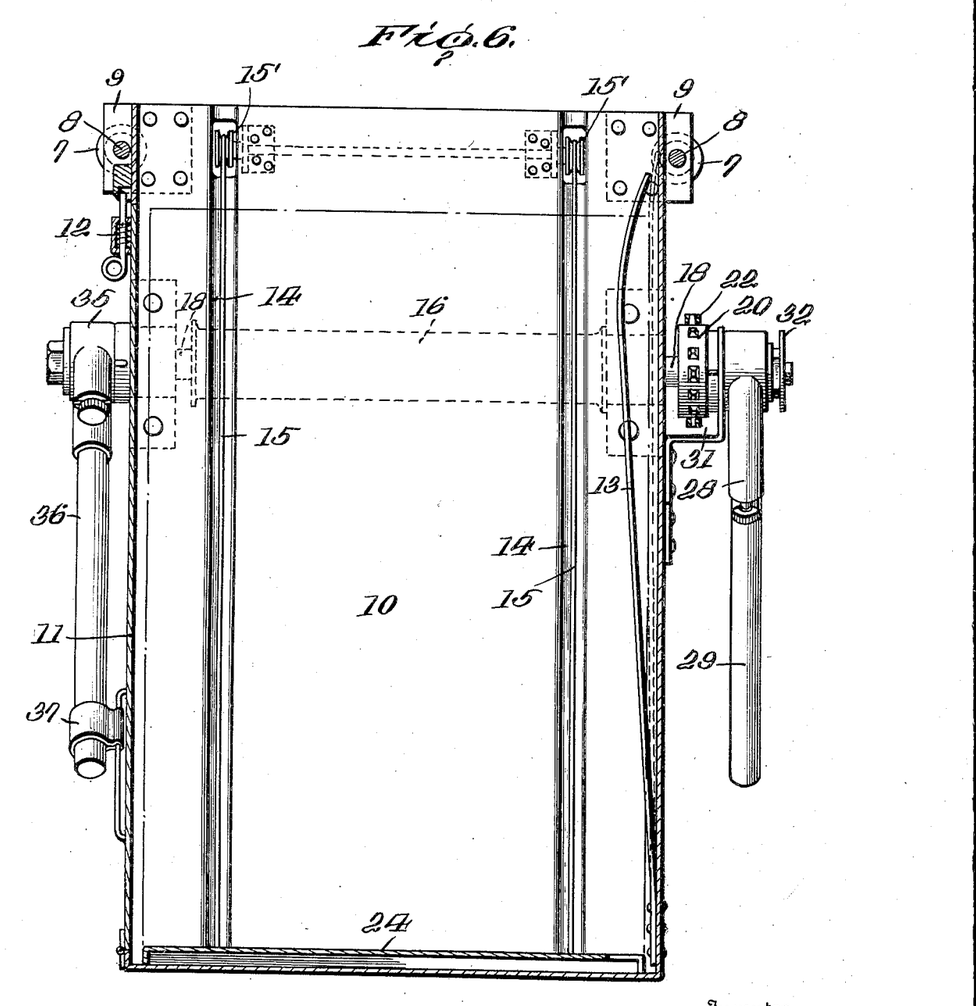
Figure 6 is a vertical section through the ice carriage showing the door and the means for fastening the same.

In carrying out my invention I employ a rectangular frame, the upper horizontal bars 1 of which are preferably formed of channel irons as shown in Figure 10 in which are arranged angle irons 2 forming tracks for grooved rollers 3 carried by stud shafts 4 secured to the corners of a rectangular frame 5, the rollers 3 working loose on the stud shafts 4 in order to maintain the frame free in its proper alignment so that it can be reciprocated freely.

The rectangular frame 5 is formed of channel irons in which are disposed angle irons 6 forming tracks for grooved rollers 7 which are loosely mounted on shafts 8 loosely mounted in bearings 9 carried by the upper end of a rectangular box-like ice carriage 10 in order to suspend the ice carriage in the movable frame in order to allow it to move freely.

One end of the ice carriage is open and adapted to be closed by a hinged door 11 held in closed position by spring latch 12, said door being capable of swinging downwardly out through one end of a frame to form a skid in order to allow the cake of ice to be placed therein and when the door is in closed position, it will be held therein under tension by bowed spring member 13 to prevent the same from rocking.

The construction of wheels and tracks with the loosely mounted wheels maintains the carriage in its proper alignment in order to allow it to move freely.

The opposite sides of the ice carriage are provided with bent out portions 14 forming grooves in which are disposed cables 15 carried by drums 16 and 17 which are mounted on shafts 18 and 19 and are provided with sprocket wheels 20 and 21 over which pass a sprocket chain 22 in order to allow the rollers to rotate in unison. The cables pass upwardly over pulleys 15' and have their opposite ends connected to the ears 23 working in the grooves 14, said ears being carried by platform 24 and adapted to move up and down in the box-like carriage to elevate the cake of ice.

One end of the shaft 18 carries a ratchet wheel 25 provided with ratchet teeth 26, the grooves between the ratchet teeth being struck on the arc of a circle and in which is adapted to work a spring actuated pawl 27 mounted in a head 28 and provided with a lever 29 which is adapted to engage a fixed stop 30 for oscillating the same in order to rotate the shaft to wind up the cables on the drum to lift a block of ice within the ice carriage in the movement of the ice carriage from one end of the frame to the other.

Figure 7:
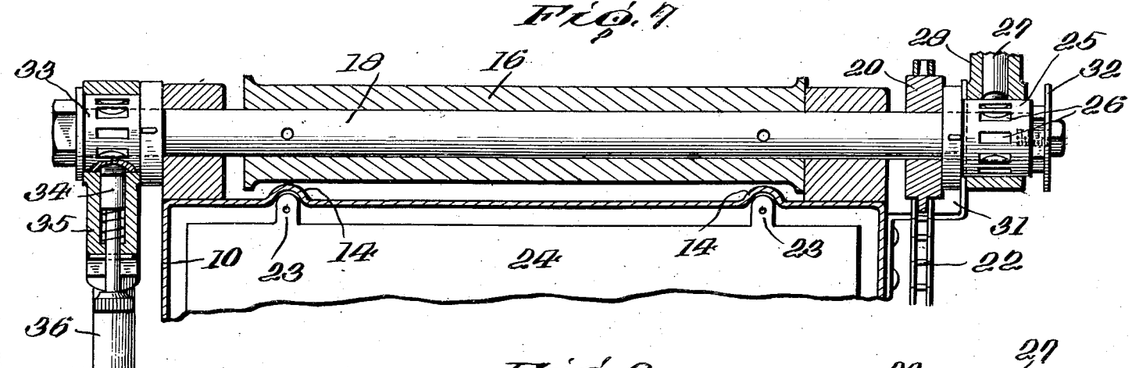
Figure 7 is a horizontal section through the mechanism for elevating the platform of the ice carriage showing it in its normal position.
Figure 8:
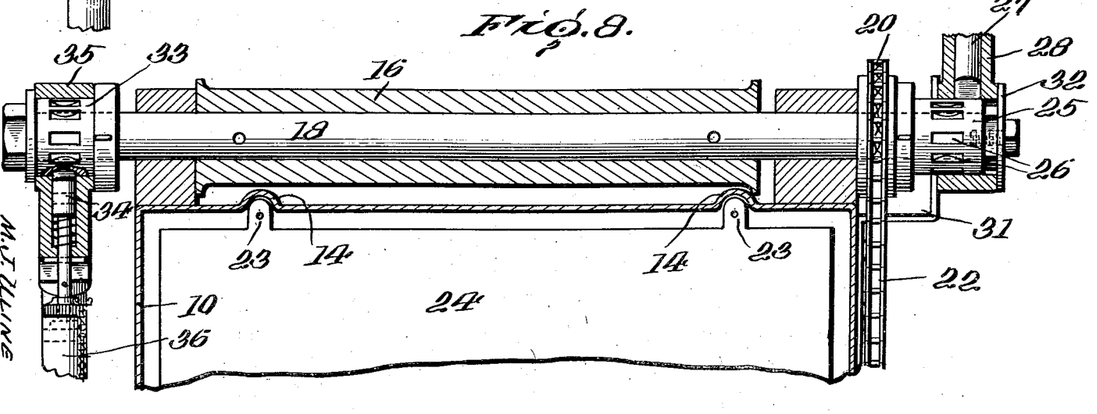
Figure 8 is a similar section showing the mechanism shifted to allow the same to be operated manually for initially positioning the cake of ice therein.

The ratchet wheel is feathered on the shaft 18 and the movement is limited in one direction by a bracket 31 and the other movement by a disc 32. The shaft 18 is loosely mounted in its bearings and is capable of being shifted longitudinally from the position shown in Figure 7 to the position shown in Figure 8 in order to dislodge the pawl 27 from the grooves between the teeth, this being facilitated by forming the bottom of the grooves curved or struck on the arc of a circle and the end of the pawl curved or struck on the arc of a circle to correspond therewith whereby the pawl will ride out of engagement with the ratchet teeth when the shaft is shifted longitudinally in its bearings to disconnect the same.

The other end of the shaft has fixed thereon a similarly constructed ratchet wheel 33 which is engaged by a similarly constructed pawl 34 arranged in a reverse manner to the pawl 27 in order to prevent the shaft 18 from turning backwardly after it has been rotated by the lever coming into contact with the fixed member during the reciprocation of the ice carriage.

The pawl 34 is mounted in a head 35 and carries a lever 36 which is adapted to be normally held by a fastening member 37 carried by the door 11. This provides means for intermittently elevating the platform as the carriage is reciprocated and the lever 29 has a coil spring connected thereto for returning it to normal position after it has been shifted by coming into contact with the fixed stop so that as the carriage is reciprocated, the lever is oscillated back and forth to elevate the cake of ice within the ice carriage.

After the platform has been elevated the proper distance to cut the proper amount of ice from the cake of ice in the ice carriage, by grasping the lever 36 and shifting the shaft 19 longitudinally, it will disconnect the pawl 27 and by pulling out on the pawl 34, the weight of the platform will cause the cables to be unwound from the drums in order to be returned to the bottom of the carriage where the small sliver of ice can be removed before another block is inserted.

When it is desired to place the cake of ice in the ice carriage, the lever 36 is released by shifting the fastening member 37 and is swung out of the path of travel of the door in order to allow the door to be dropped so that a block of ice can be placed therein. After the door has been closed, the pawl 34 is drawn outwardly and turned in order to shift it from a holding pawl to an operating pawl and by operating the lever 36, the shaft 19 can be rotated in order to wind up the cables on the drums in order to initially position the platform within the ice carriage so that the end of the ice will be elevated the proper distance in order to allow the cubes to be cut therefrom.

This provides a construction of elevating mechanism of a block of ice within the ice carriage in which pawl and ratchet mechanism is employed for intermittently elevating the block of ice within the ice carriage a predetermined distance and as the pawl and ratchet mechanism is operated intermittently as the carriage is reciprocated in timed relation thereto, the block of ice will be elevated so as to be operated on by the gang and cut off saws.

A bridge member 38 spans the main frame and carries an electric motor 39 and the drive shaft 40 of which at one end is provided with a pulley 40 over which passes the drive belt 41. The drive belt 41 passes over a pulley 42 carried by a shaft 43 which is provided with a plurality of gang saws 44. These saws are so positioned in respect to the movable ice carriage that when the ice carriage reaches its limit of movement in the movable frame, the frame is reciprocated and the block of ice as it is moved upwardly in the ice carriage is brought into contact with the top thereof in order to form a plurality of kerfs therein and as the block of ice is reciprocated intermittently after the kerfs have been formed and as the ice carriage is reversed, the saws pass through the previously formed kerfs. This provides one of the means for forming a plurality of kerfs in a block of ice.

The shaft 43 which is mounted in suitable bearings on the main frame in the bridge member 38 carries a beveled gear 45 which meshes with a beveled gear 46 carried by shaft 47 mounted in suitable bearings carried by the bridge member 38. This shaft carries beveled gears 49 and 50 which mesh with beveled gears 51 and 52 carried by saw arbors 53 and 54 mounted in suitable bearings suspended from the bridge member 38 and are provided with horizontally disposed cut off saws 55 and 56 for cutting off the previously formed cubes.

Figure 1:
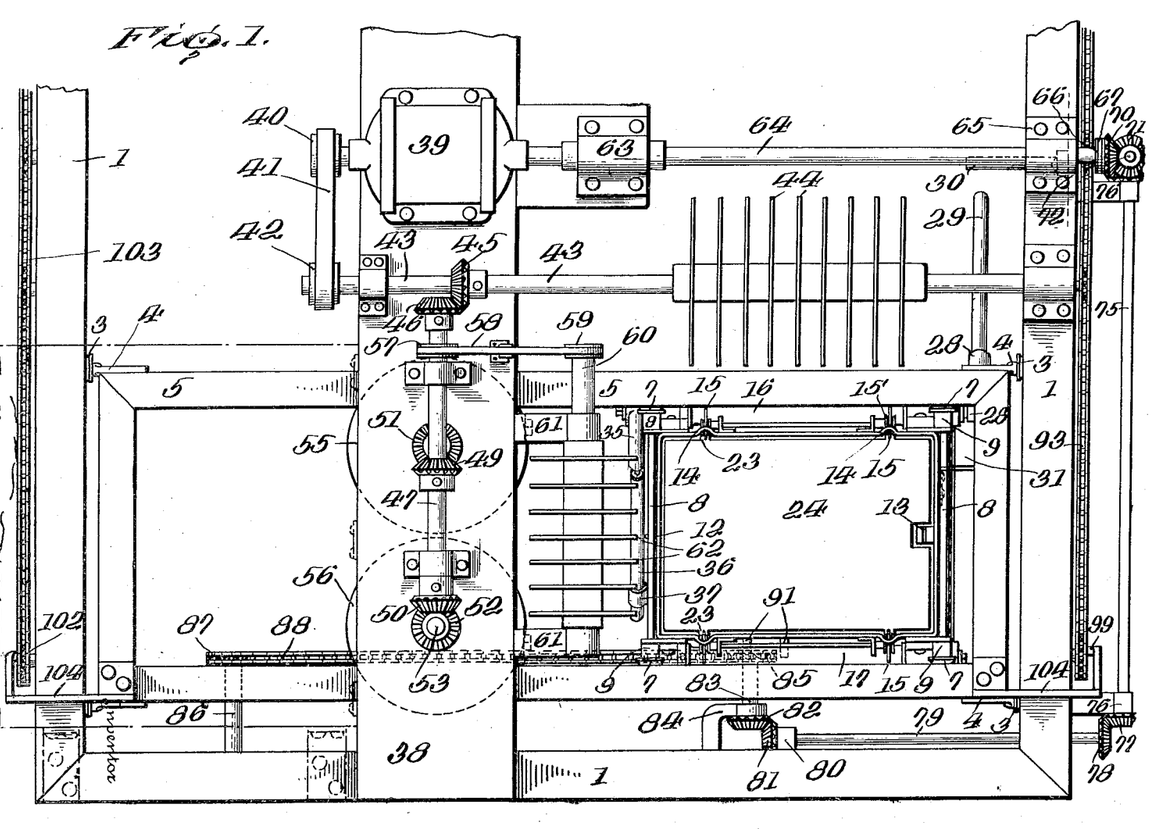
Figure 1 is a top plan view of a machine for cutting ice constructed in accordance with my invention, a portion of the frame being broken away.
Figure 2:
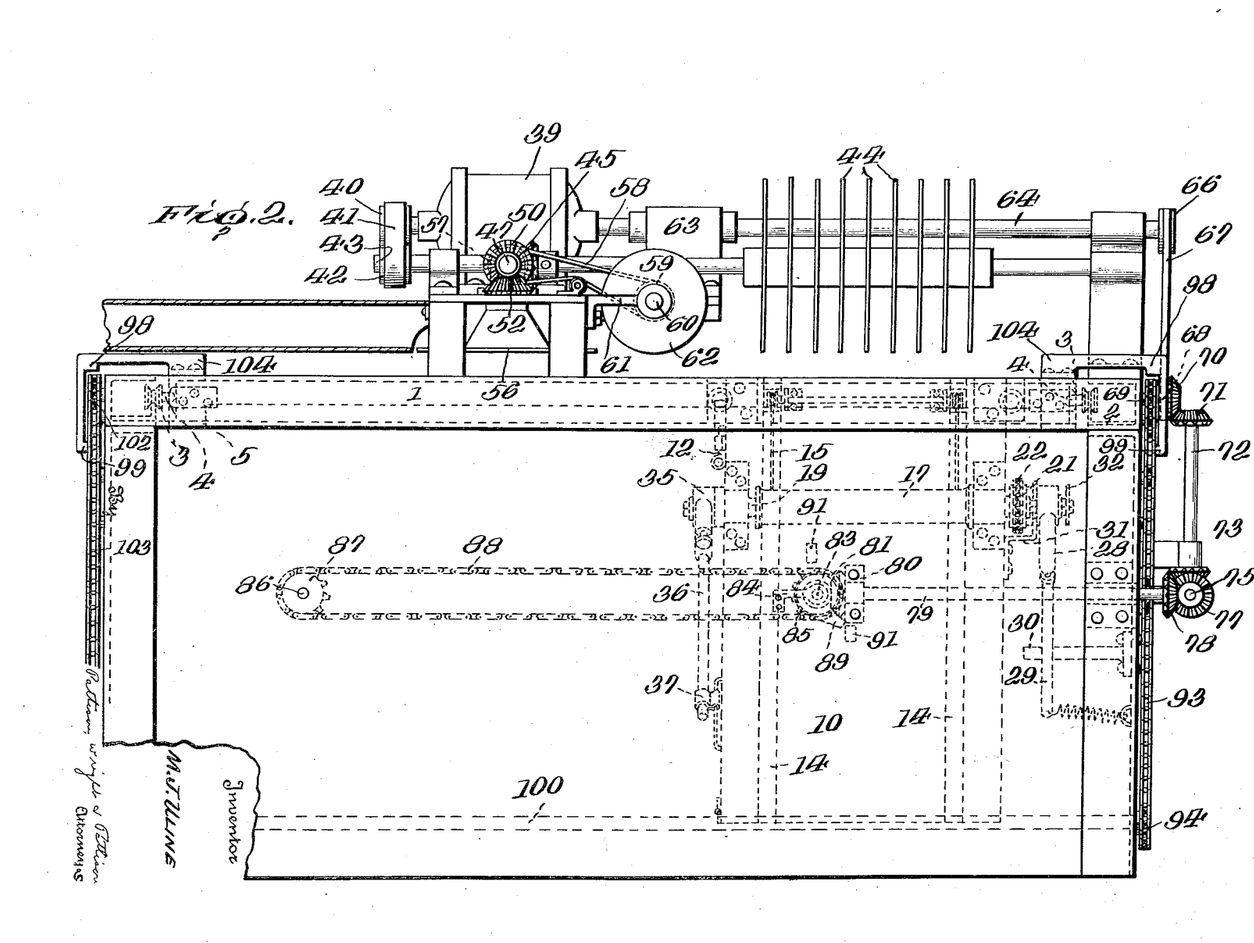
Figure 2 is a side elevation of the same, showing some of the parts in dotted lines.

The shaft 47 carries a pulley 57 over which passes a belt 58 which passes over a pulley 59 carried by a saw arbor 60 mounted in suitable hangers 61 as shown in Figure 1 and said saw arbor carries a plurality of saws 62 which are arranged parallel with one another to form a plurality of kerfs in the top of the cake of ice at right angles to the plurality of parallel kerfs formed by the parallel arranged gang saws 44.

By driving the gang saws 44 and gang saws 62 by belts 41 and 58, a yieldable drive is provided which allows a slippage in case the saws should jam for any unknown reason.

The electric motor 39 has the opposite end of its drive shaft extended into a reduction gear box 63 as shown in Figure 1 and extending from said gear box is a drive shaft 64 mounted in a suitable bearing 65 and said shaft carries a pulley 66 over which passes a belt 67. This belt passes over a pulley 68 carried by a stud shaft 69 mounted on the end of a frame.

The stud 69 carries a beveled gear 70 which meshes with a beveled gear 71 carried by the upper end of a shaft 72, the lower end of which carries a beveled gear 73 which meshes with a beveled gear 74 carried by shaft 75 mounted in suitable bearings 76. The other end of the shaft 75 carries a beveled gear 77 meshing with a beveled gear 78 carried by shaft 79 mounted in suitable bearings 80. This shaft carries a beveled gear 81 meshing with a beveled gear 82 carried by shaft 83 mounted in a bearing 84. The shaft 83 carries a sprocket wheel 85 and disposed in the main frame is a stud shaft 86 carrying a sprocket 87 and passing over the sprocket 85 and 87 is a drive chain 88 provided with a drive lug 89 which is adapted to cooperate with members 91 carried by the ice carriage so that the ice carriage will be intermittently reciprocated in timed relation with the reciprocation of the frame 5 as will be hereinafter fully described.

Figures 3, 9:
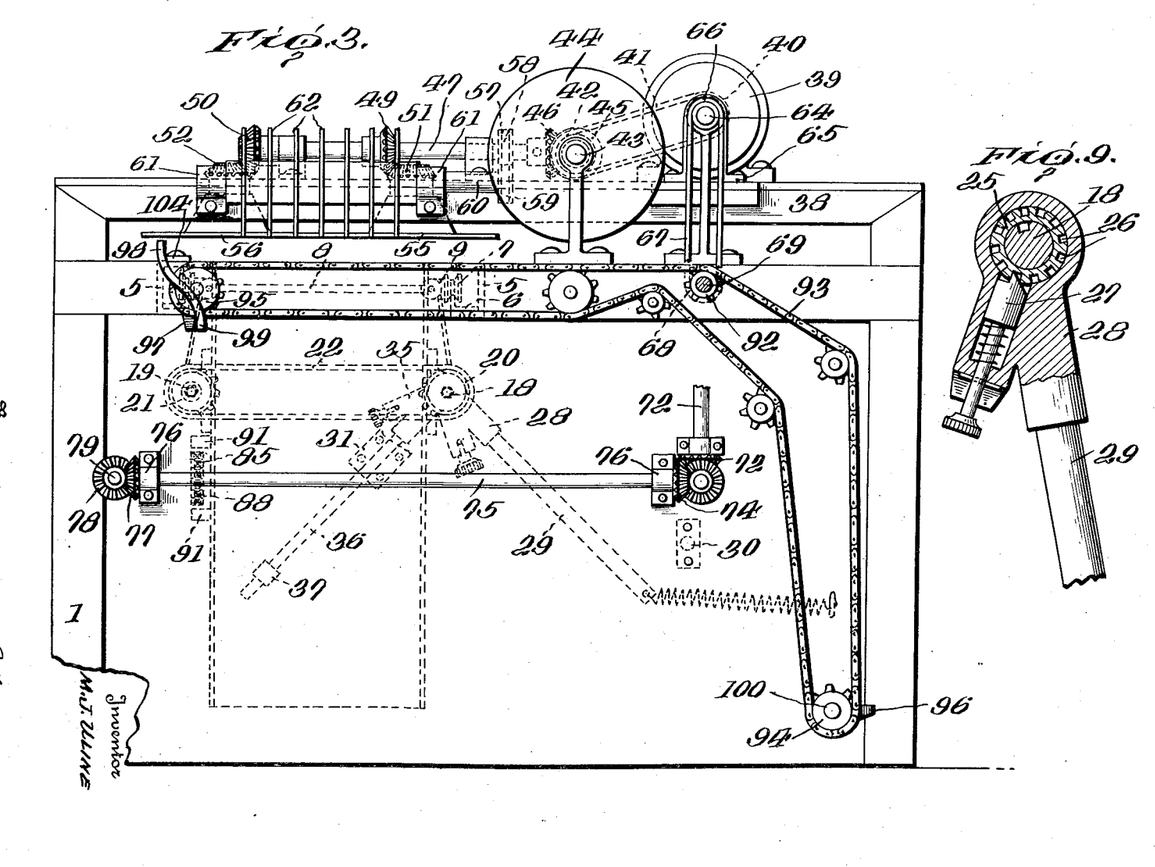
Figure 3 is an end elevation showing the drive chain with a movable frame and the means for operating the movable platform for elevating the ice in the ice carriage.
Figure 9 is a detail section through one of the pawl and ratchet mechanisms.
Figure 4:
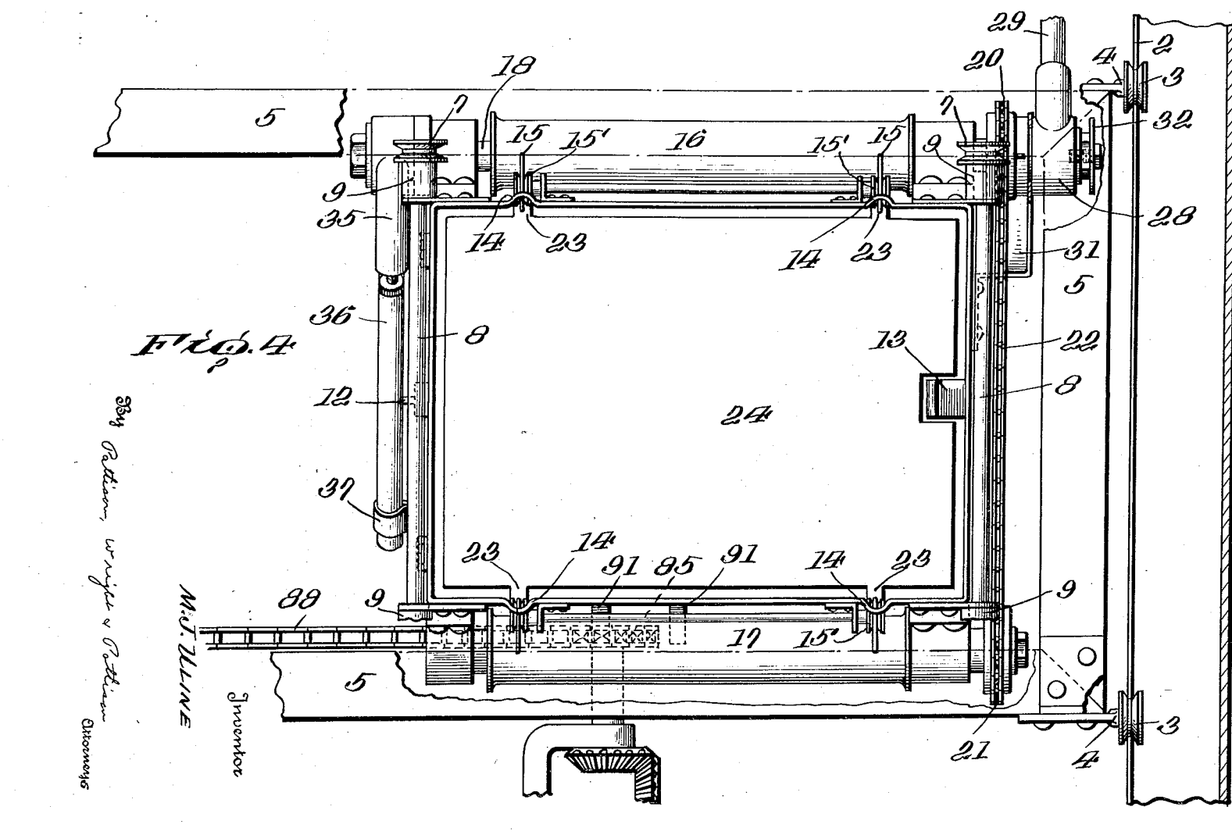
Figure 4 is an enlarged top plan view of the ice carriage and the frame for supporting the same, the frame being broken away.

The shaft 69 carries a sprocket wheel 92 over which passes a drive chain 93 and is mounted on suitable sprockets 94 and 95, as clearly shown in Figure 3 in order to provide the proper length of chain to intermittently reciprocate the frame 5. This chain is provided with drive lugs 96 and 97 which cooperate with members 98 and 99 carried by the frame 5 so as to intermittently reciprocate the frame 5 in such a manner that it will be held stationary in order to allow the ice carriage to reciprocate within the frame and bring the top of the cake of ice into engagement with the gang saws 62 and the cut off saws 55 and 56.

This provides means for intermittently driving the frame 5 in timed relation with the drive chain 88 for the ice carriage.

The sprocket wheel 94 is carried by a shaft 100 and extends across the frame and carries a sprocket wheel (not shown) over which passes a sprocket chain 103 constructed and mounted in substantially the same manner as the sprocket chain 93 with the usual drive lugs cooperating with the members carried by the frame so as to provide means at each end of the movable frame for reciprocating the same within the main frame.

The frame 5 carries overhanging members 104 forming the members 98 and 99 which are engaged by the drive lugs 96 and 97 of the respective chains whereby the frame 5 is intermittently reciprocated by a pair of drive chains disposed on each end of the frame.

Figure 11:
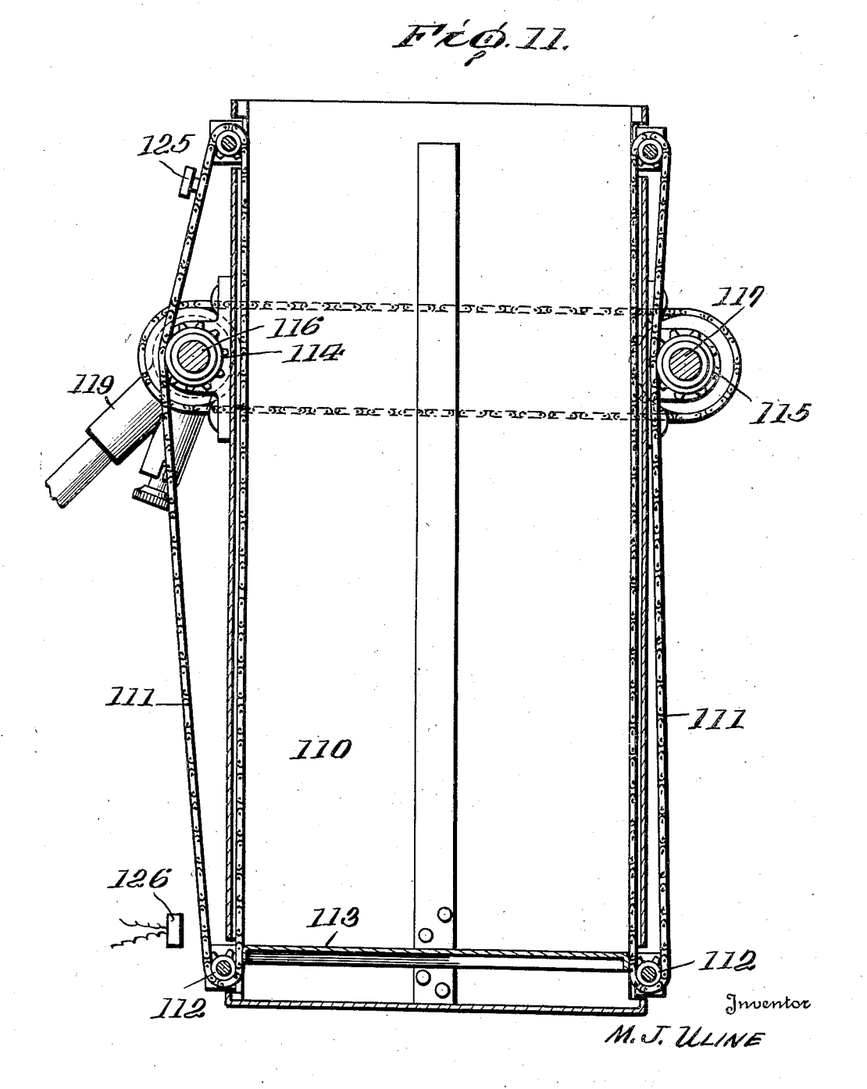
Figure 11 is a vertical section through a modified form of elevating mechanism of the ice carriage wherein chains are substituted for the cables.
Figure 12:
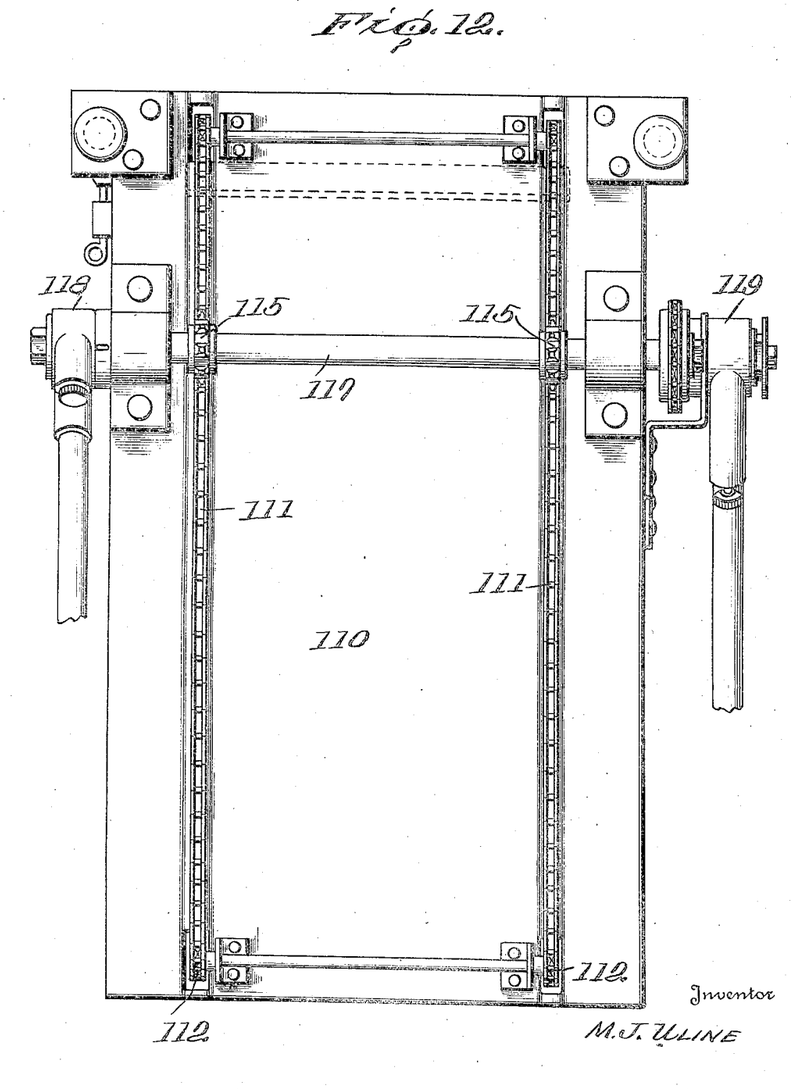
Figure 12 is a side view of the same.

In the modification shown in Figures 11 and 12, I have shown an ice carriage 110 with chains 111 mounted on sprockets 112, said chains being connected to the movable platform 113 disposed therein. The chains are driven by sprocket wheels 114 and 115 carried by shafts 116 and 117 corresponding to the shafts 18 and 19 of the construction disclosed in Figures 1 to 10, which shafts are operated by pawl and ratchet mechanism 118 and 119, which pawl and ratchet mechanism is constructed identically as previously disclosed and described and the operation is identical and it is not necessary that a detailed description be given.

While in the preferred embodiment of my invention I have shown cables for elevating a platform, I wish it to be clearly understood that the chains can be substituted therefor as disclosed in Figures 11 and 12, as I have found that chains are more accurate when used in connection with the elevating mechanism and therefore I reserve the right to use either cables or chains in connection with the elevating mechanism as herein shown and described.

One of the chains 111 is provided with a projection 125 which is adapted to cooperate with the switch 126 when the carriage is moved into its initial position so as to cut off the electrical energy to the motor and stop the machine in such a position that the ice carriage can be manipulated to properly position a block of ice and I do not wish to limit myself to the use of any particular construction of switch as various forms can be used without departing from my invention which consists in arranging a switch member in the path of travel of a projection carried by one of the elevating chains so that after the platform has been raised a predetermined distance within the ice carriage and the ice carriage returns to its initial position, the projection will cooperate with the switch in order to stop the machine.

The switch can be so constructed that when it is desired to start the machine the switch can be manipulated so as to supply the energy to the electric motor to drive the machine and it will be out of the path of travel of the projection until said projection has moved such a distance as to elevate the ice carriage a predetermined distance.

In the operation of the machine assuming that the ice carriage is within the frame adjacent the door and the levers are manipulated so as to elevate the platform the desired distance to properly position the cake of ice, by operating the switch electrical energy will be supplied to the electric motor and through the driving mechanism, the carriage will be reciprocated away from the door. Until it reaches the end of the limit of movement and through the driving mechanism for the frame, the frame which supports the ice carriage will be reciprocated at right angles to the original path of travel of the ice carriage so as to bring the block of ice into contact with the gang saws and then it will be returned and the driving mechanism disconnected.

It is, of course, understood that the driving mechanism for the initial movement of the carriage is disconnected as soon as the frame moves away from the driving chain. The return of the frame brings the drive lugs in contact with the lugs of the chain so as to return the carriage towards the door and in its movement the block of ice passes under the gang saws and cut off saws so as to cut a plurality of cubes of ice from the top of the cake of ice.

This movement is repeated through the timed relation of the drive chains in respect to the movable carriage and movable frame and as the elevating mechanism is operated automatically by the movement of the carriage after the cubes have been cut from the top of the block of ice, the block of ice is elevated a predetermined distance.

From the foregoing description it will be seen that I have provided a machine for cutting ice into cubes which is composed of a main frame in which is mounted a reciprocating frame carrying a reciprocating ice carriage which is suspended therein so that the block of ice within the ice carriage is first reciprocated in one direction and then at right angles thereto in order to bring the cake of ice into engagement with the respective gang saws and cut off saws.

What I claim is:

1. In a machine for cutting blocks of ice into small cubes, the combination with a frame provided with tracks, of a supporting frame provided with wheels mounted on said tracks, tracks carried by the supporting frame, an ice carriage mounted on said last mentioned tracks, means for intermittently reciprocating said ice carriage within the supporting frame and intermittently reciprocating the supporting frame within the main frame in timed relation with one another, a platform disposed within said ice carriage and pawl and ratchet mechanism for intermittently raising said platform and additional means for operating said pawl and ratchet mechanism for initially positioning said platform.

2. In a machine for cutting large blocks of ice into small cubes or the like, the combination with a frame, of a plurality of gang saws arranged at right angles to one another, a supporting frame mounted to reciprocate in the main frame, an ice carriage suspended within the supporting frame and adapted to be reciprocated therein, means for intermittently driving said ice carriage and said supporting frame in timed relation with one another, means for automatically raising a block of ice intermittently within the ice carriage and a pair of cut off saws arranged in the path of travel of the block of ice within the ice carriage for cutting off the previously formed cubes.

3. In a machine for cutting a block of ice into small cubes or the like, the combination with means for reciprocating a block of ice in two defined paths, one at right angles to one another, said means comprising an ice carriage having means for intermittently elevating a block of ice automatically therein as the carriage is reciprocated, manually operated means for operating said elevating means for initially positioning a block of ice, said elevating mechanism being capable of being disconnected to allow said elevating means to return to its normal position.

4. In a machine for cutting large blocks of ice into small cubes, an ice carriage adapted to receive a block of ice and capable of being moved in two defined paths at right angles to one another to cut parallel kerfs at right angles to one another in a block of ice, elevating mechanism for said ice carriage comprising a platform to receive and support a block of ice, said platform being supported by flexible means and pawl and ratchet mechanism for operating said flexible means, said pawl and ratchet mechanism being capable of being disconnected to allow said platform to return to its normal position.

5. In a machine for cutting large blocks of ice into small cubes, an ice carriage adapted to receive and hold a block of ice, means for reciprocating the block of ice in two defined paths at right angles to one another to form parallel kerfs at right angles to one another in the top of said block, said ice carriage having a movably mounted platform, a pair of shafts carrying chains connected to said platform, pawl and ratchet mechanism for intermittently rotating said shafts, means for disconnecting said pawl and ratchet mechanism to allow said platform to return to its normal position and additional means for manually operating said pawl and ratchet mechanism for initially positioning said platform within said carriage.

6. In a machine for cutting large blocks of ice into small cubes, an ice carriage comprising a rectangular box-like member having a movably mounted platform disposed therein, a pair of shafts arranged on opposite walls of said ice carriage, drums carried by said shafts, cables connected to said drums having a connection with said platform, said shafts being provided with ratchet wheels at its ends, levers provided with heads carrying pawls cooperating with said ratchet wheels, one of said levers being adapted to be automatically oscillated to elevate said platform by winding the cables upon said drums, one of said levers being capable of being shifted out of contact with its respective ratchet and the other of said levers being adapted to be manually oscillated to initially position the platform within said ice carriage.

7. In a machine for cutting large blocks of ice into small cubes, a suspended reciprocating ice carriage having a platform disposed therein for supporting a block of ice, means for intermittently reciprocating said block of ice within said carriage in defined paths at right angles to one another and in timed relation with one another, saws for forming kerfs at right angles to one another within said block of ice and for cutting the previously formed cubes therefrom arranged in the path of travel of said block of ice, cables having one of their ends connected to said supporting platform and the other to winding drums, and pawl and ratchet mechanism for intermittently rotating said drums to intermittently elevate the block of ice therein, said pawl and ratchet mechanism comprising levers, one of said levers being adapted to be operated automatically and the other manually for elevating said platform.

8. In a machine for cutting large blocks of ice into small cubes, the combination with an ice carriage for supporting a block of ice and moving said block of ice in two defined paths arranged at right angles to one another, saws arranged in the path of travel of said block of ice to form parallel kerfs at right angles to one another within said block of ice and for cutting the previously formed kerfs from the top of the block of ice, a movable platform disposed within said ice carriage and suspended therein by flexible means, pawl and ratchet mechanism for operating said flexible means intermittently to elevate the block of ice within the ice carriage, means for disconnecting said pawl and ratchet mechanism to allow said platform to return to its initial position and manually operated means for initially positioning said platform within said ice carriage.

9. In a machine for cutting blocks of ice into cubes, the combination with gang saws arranged at right angles to one another, of an ice carriage for intermittently reciprocating a block of ice in two defined paths arranged at right angles to one another, pawl and ratchet mechanism for elevating a block of ice within the ice carriage in respect to said gang saws, said pawl and ratchet mechanism comprising levers, one of which is adapted to be engaged and operated by the momentum of the ice carriage and the other lever being capable of being manually operated for initially positioning the block of ice within the ice carriage with respect to said gang saws.

10. In a machine for cutting blocks of ice into small cubes and the like, the combination with gang saws arranged at right angles to one another, of means for reciprocating a block of ice in two defined paths, at right angles to one another, said means comprising an ice carriage having means for intermittently elevating a block of ice automatically therein as the carriage is reciprocated and manually operated means for operating said elevating means for initially positioning a block of ice in the ice carriage in respect to said gang saws.

MIGIEL J. ULINE.